Oct. 16, 1956 W. E. THOMPSON 2,767,204
PREVENTING DISCOLORATION OF PARTIALLY OXIDIZED PETROLEUM
Filed Aug. 5, 1953
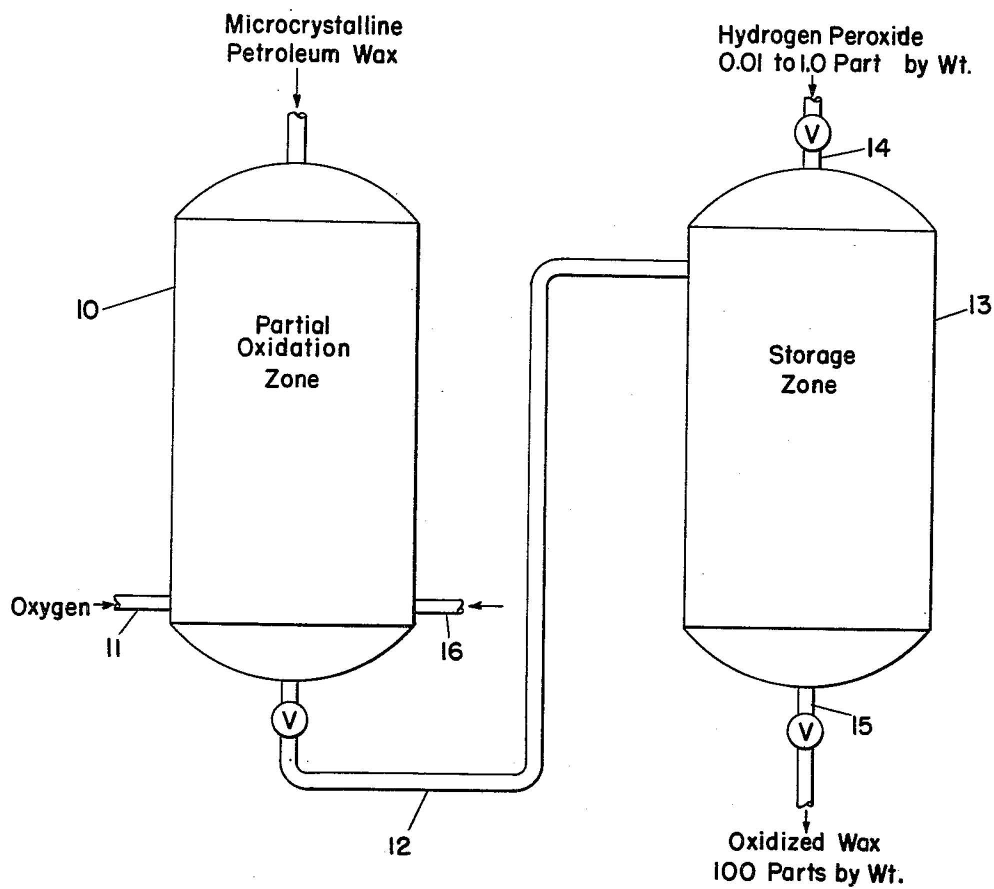
INVENTOR.
WILLIAM E. THOMPSON
BY
Robert O. Spurdle
ATTORNEY 2,767,204
Patented Oct. 16, 1956

2,767,204

PREVENTING DISCOLORATION OF PARTIALLY OXIDIZED PETROLEUM

William E. Thompson, Wallingford, Pa., assignor to Sun Oil Company, Philadelphia, Pa., a corporation of New Jersey Application August 5, 1953, Serial No. 372,497

4 Claims. (Cl. 260—452)

This invention relates to the prevention of excessive discoloration of partially oxidized petroleum materials containing carboxylic acid products of partial oxidation while maintaining the partially oxidized petroleum materials at elevated temperatures.

It is known in the art to partially oxidize petroleum materials, e. g. microcrystalline wax, paraffin wax, foots oil, lubricating oil, and lighter petroleum fractions, to obtain carboxylic acid products of oxidation. The oxidation product mixture obtained in such oxidation may typically have saponification number within the range from 50 to 150 mg. of KOH per gram, and generally contains unoxidized hydrocarbons, unsaponifiable oxidation products, and saponifiable oxidation products, the latter including carboxylic acid materials.

At the end of the oxidation period, the oxidation product mixture is generally removed from the oxidation zone, and then may be treated in various different ways as known in the art. For example, it may be treated for separation of various types of constituents of the product mixture. On the other hand, the product mixture may be transported and stored without any such separation.

It frequently happens that the product mixture, or certain constituents separated therefrom, are maintained at elevated temperatures for substantial periods of time subsequent to the completion of the oxidation. For example, in the case of oxidation product mixtures which are normally solid, such product mixtures are frequently treated, transported, stored, etc. in liquid phase, the temperature therefore necessarily being elevated in order to maintain the product mixture in liquid phase. Normally liquid oxidation mixtures may also be maintained at elevated temperature for substantial periods of time for various reasons. For example, the product mixture may be contacted with a volatile selective solvent at elevated temperature in order to extract certain constituents from the product mixture. Subsequently, solvent may be distilled at elevated temperature from the extract and raffinate phases obtained in the extraction.

A problem that arises in the maintenance of oxidation product mixtures at elevated temperatures, e. g. in excess of 100° F., for substantial periods of time, is the discoloration of the product mixture, particularly when the temperature is above 150° F. A product mixture which as originally obtained has good color, e. g. N. P. A. 2½ plus, may become too dark to be measured on the N. P. A. scale after maintenance at 240° F., for example, for 16½ hours. This discoloration constitutes a serious disadvantage of prior art methods of handling oxidation product mixtures at elevated temperatures after removal from the oxidation zone.

According to the present invention, excessive discoloration of petroleum oxidation mixtures, or separated constituents thereof, is prevented by contacting such materials with 0.01 to 1.0 part by weight, preferably 0.05 to 0.5 part by weight, of hydrogen peroxide per 100 parts of such material. It has been found that excessive discoloration of the material can be prevented for periods in the neighborhood of 10 hours by the addition to the material of a small amount of hydrogen peroxide. It has further been found that excessive discoloration of the material can be prevented for longer periods by the periodic addition of small amounts of hydrogen peroxide added within 10 hours of each other.

A preferred manner of operation according to the present invention, when oxidized petroleum is to be maintained at elevated temperature for fairly long periods of time, e. g. more than 10 hours, is to add relatively small amounts of hydrogen peroxide in increments added within 10 hours of each other, rather than adding one large amount of hydrogen peroxide at the beginning with no subsequent increments. It has been found that this preferred manner of operation generally provides, for a given total amount of hydrogen peroxide added, a better product color than that obtained with addition of the total amount at the beginning of the period.

The use of hydrogen peroxide according to the invention can be performed with highly advantageous results to prevent excessive discoloration at temperatures up to about 300° F. The temperature used depends on the requirements of the particular operation involved, taking into account the nature of the oxidation product mixture. For example, in handling oxidation products of microcrystalline wax in liquid phase, the temperature will generally be at least 180° F., since the melting point of the oxidized microcrystalline wax is generally high enough to require that high a temperature in order to maintain the oxidized wax in liquid phase.

Any suitable way of contacting the oxidized materials with the hydrogen peroxide can be employed. For example, in maintaining oxidized materials in liquid phase at elevated temperature in a tank, aqueous hydrogen peroxide in suitable amount can simply be poured onto the upper surface of the body of oxidized materials. Generally, the aqueous hydrogen peroxide tends to sink to the bottom of the tank, because of greater density than the oxidized materials. No agitation of the oxidized materials is required, though agitation may be provided if desired.

In transportation of oxidized materials in liquid phase at elevated temperature through a conduit, hydrogen peroxide can, according to the invention, be injected into the conduit. On the other hand, if hydrogen peroxide has been added, according to the invention, to the oxidized materials recently enough prior to such transportation, injection of hydrogen peroxide during the transportation is not necessary.

Similarly, in treatment with a solvent, hydrogen peroxide may be added during the solvent treatment, though such addition may not be necessary if hydrogen peroxide has been added to the oxidized materials recently enough prior to the solvent treatment. In distillation of solvent from the extract and raffinate phases, however, it is generally preferable to add hydrogen peroxide slowly but continuously during the distillation, since the distillation conditions may otherwise cause the hydrogen peroxide to be removed too rapidly from the distillation zone. In the light of the present specification, a person skilled in the art can select a suitable rate of introduction of hydrogen peroxide during the distillation. Examples of volatile solvents which, according to the invention, may be contacted with the oxidized petroleum and subsequently removed by distillation, are hydrocarbon materials such as pentane, petroleum ether, naphtha, gasoline, etc., aliphatic alcohols such as methanol, ethanol, isopropanol, etc., ketones such as acetone, methyl ethyl ketone, lower fatty acids such as acetic acid, other solvents such as pyridine, mixtures of solvents, etc. Other volatile solvents suitable for treatment of oxidation products of petroleum can also be used.

The method of the present invention can be advantageously applied to partially oxidized petroleum materials obtained by any suitable method of liquid phase oxidation. Generally preferred oxidation conditions, when the charge material is a petroleum wax or foots oil or lubricating oil, include the use of an oxidation catalyst such as manganese naphthenate or other catalyst of the well-known metallic oxidation catalyst type, an oxidation temperature in the range from 200° F. to 300° F., an oxidation pressure in the range from atmospheric pressure to 100 p. s. i. g., and the use of a free-oxygen containing gas, e. g. air, oxygen, ozone, ozonized air, etc. as oxidizing agent. Other known oxidation conditions can also be employed.

The contact which occurs between hydrogen peroxide and oxidized wax according to the invention, because of the small amounts of hydrogen peroxide used, usually produces only slight, if any, additional oxidation of hydrocarbons to produce carboxylic acids. Preferably, the amount of additional oxidation will be insufficient to produce an increase in saponification number of more than 5 mg. of KOH per gram; usually the increase in saponification number will not be more than about 1 mg. of KOH per gram in a 10–20 hour period. The addition of hydrogen peroxide according to the invention is an addition after the principal oxidation of the charge material has been completed.

The invention will be further described with reference to the attached drawing, which illustrates one embodiment of the method of the invention. In the method illustrated, microcrystalline wax, as an example of petroleum material which can be used, is partially oxidized in oxidation zone 10 by means of a free-oxygen containing gas introduced through line 11. The oxidation is continued for the desired length of time, e. g. until the saponification number of the oxidized wax is about 70. Then the oxidized wax, in liquid phase, is withdrawn from oxidation zone 10 through line 12 and introduced into storage zone 13, wherein it is maintained in liquid phase at elevated temperature, e. g. about 240° F., for a substantial period of time, e. g. about 10 hours. Storage zone 13 can be either an open tank or a closed tank with venting means not shown. Before, during, or after introduction of the oxidized wax into storage zone 13, hydrogen peroxide, e. g. in the form of an approximately 30 percent aqueous solution, is introduced into storage zone 13 through line 14, in amount to provide 0.01 to 1.0 part by weight of hydrogen peroxide per 100 parts of oxidized wax. At the end of the 10 hour period, the contents of storage zone 13 are removed through line 15. The hydrogen peroxide has by this time been substantially completely vaporized, but has prevented excessive discoloration of the oxidized wax during the 10 hour period. The oxidized wax removed through line 15 contains no substantial amount of any residue from the contacting with hydrogen peroxide.

If the oxidized wax were maintained at elevated temperature in storage zone 15 for a period longer than 10 hours, it would be advisable to add hydrogen peroxide periodically at intervals not exceeding 10 hours.

It is to be understood that, alternatively to the operation shown in the drawing, hydrogen peroxide could be introduced, after the completion of the oxidation, into oxidation zone 10 through line 16. Then the oxidized wax, to which hydrogen peroxide had been added, could be removed through line 12 and introduced into storage zone 13. In this case, the effect of the hydrogen peroxide in preventing excessive discoloration would extend to the transportation through line 12 and to the storage in zone 13. Similarly, the effect of the hydrogen peroxide would extend to any special treatment, at elevated temperature, e. g. a solvent treatment, to which the oxidized wax might be subjected after removal from oxidation zone 10 and before introduction into storage zone 13.

The following examples illustrate the invention:

*Example 1*

200 grams of partially oxidized petroleum microcrystalline wax, to which 0.8 gram of a 30% solution of hydrogen peroxide in water had been added was maintained in liquid phase at a temperature of 240° F. for 16½ hours. For purposes of comparison, another sample of the same oxidized microcrystalline wax, to which no hydrogen peroxide had been added, was also maintained at 240° F. for 16½ hours.

The oxidized microcrystalline wax had been prepared by oxidation at 250° F. with air in the presence of aluminum stearate as oxidation catalyst, the oxidation charge containing 0.04 weight percent of aluminum. The oxidation was continued until the saponification number of the oxidized wax was 68. The color of the oxidized wax was 2½ plus on the N. P. A. scale.

During the heating of the oxidized wax at 240° F., samples were removed periodically from each of the two batches, i. e. the one to which hydrogen peroxide had been added and the one to which hydrogen peroxide had not been added. The N. P. A. colors of the removed samples were determined, and are shown in the following table for the various heating periods:

| Time of Heating in Hours | Color | |
|---|---|---|
| | With $H_2O_2$ | Without $H_2O_2$ |
| 0 | 2½+ | 2½+. |
| 2 | 2 | 2+. |
| 4 | 2½+ | 3+. |
| 7 | 2½+ | 3½. |
| 9 | 2½+ | 3½+. |
| 13 | 4+ | 7. |
| 14½ | 4½+ | 7+. |
| 16½ | 5½+ | Too dark to measure. |

This table shows that 0.4% of 30% hydrogen peroxide is capable of preventing, for at least 9 hours, the discoloration of oxidized microcrystalline wax at 240° F., whereas in the absence of hydrogen peroxide, substantial discoloration of the oxidized wax occurs after 9 hours. At the end of 16½ hours, the oxidized wax to which hydrogen peroxide had been added had gone off color, but to a much less extent than the oxidized wax to which hydrogen peroxide had not been added. As shown in the following example, the amount of discoloration over periods in excess of 16½ hours can be substantially reduced by adding hydrogen peroxide at intervals during the heating.

*Example 2*

The same oxidized wax charge material that was used in Example 1 was maintained at 240° F. after the addition of a few drops, i. e. about 0.2 gram, of 30% hydrogen peroxide. A few more drops were added after 6 hours, and a few after 16 hours. The weight of the oxidized wax used was 50 grams. After 24 hours, the color of the oxidized wax was found to be 3½ N. P. A. The following table shows the comparison with oxidized wax to which no hydrogen peroxide was added.

| Time of Heating in Hours | Color | |
|---|---|---|
| | With $H_2O_2$ (A few Drops at 0, 6, and 16 hours | Without $H_2O_2$ |
| 0 | 2½+ | 2½+. |
| 24 | 3½+ | Too dark to measure. |

This example shows that oxidized microcrystalline wax can be maintained at 240 F. for a period of 24 hours without excessive discoloration by adding a few drops of 30% hydrogen peroxide per 50 grams of oxidized wax at infrequent intervals, whereas the oxidized wax greatly discolors in such period when hydrogen peroxide is not added.

The invention claimed is:

1. Method for preventing excessive discoloration of partially oxidized petroleum materials containing carboxylic acid products of partial oxidation, while maintaining such materials after completion of the oxidation at elevated temperatures normally producing excessive discoloration which comprises: contacting said material in liquid phase with at least 0.01 part by weight of hydrogen peroxide per 100 parts of said material, the amount of hydrogen peroxide being contacted with said material not substantially exceeding 1.0 part by weight of hydrogen peroxide per 100 parts of said material at any time.

2. Method according to claim 1 wherein partially oxidized microcrystalline wax is maintained in liquid phase at a temperature in the approximate range from 180° F. to 300° F.

3. Method according to claim 1 wherein additional amounts of hydrogen peroxide are added within 10 hours of each other during the period of maintenance at elevated temperature.

4. Method for preventing excessive discoloration of partially oxidized petroleum materials containing carboxylic acid products of partial oxidation, while maintaining such materials after completion of the oxidation at elevated temperatures normally producing excessive discoloration which comprises: contacting said materials in liquid phase with 0.05 to 0.5 part by weight of hydrogen peroxide per 100 parts of said materials; and adding 0.05 to 0.5 part by weight of hydrogen peroxide per 100 parts of said materials to said materials 6 to 10 hours later, the amount of hydrogen peroxide being contacted with said materials not exceeding 0.5 part by weight of hydrogen peroxide per 100 parts of said materials at any time.

References Cited in the file of this patent

UNITED STATES PATENTS

| | | |
|---|---|---|
| 1,871,082 | Pungs | Aug. 9, 1932 |
| 2,435,542 | Hess | Feb. 3, 1948 |
| 2,476,417 | Jarnagin | July 19, 1949 |
| 2,524,056 | Jespersen | Oct. 3, 1950 |